(12) United States Patent
Matsuoka et al.

(10) Patent No.: US 7,788,028 B2
(45) Date of Patent: Aug. 31, 2010

(54) NAVIGATION SYSTEM

(75) Inventors: Yoji Matsuoka, Zama (JP); Teruyuki Ishida, Zama (JP); Keisuke Mutou, Zama (JP); Takashi Yoshimaru, Kokubunji (JP); Mami Nomura, Kokubunji (JP); Takaaki Ishii, Kokubunji (JP); Tsugumichi Owaki, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 936 days.

(21) Appl. No.: 11/634,981

(22) Filed: Dec. 7, 2006

(65) Prior Publication Data

US 2007/0260395 A1 Nov. 8, 2007

(30) Foreign Application Priority Data

Dec. 8, 2005 (JP) .............................. 2005-354304

(51) Int. Cl.
*G01C 21/00* (2006.01)
(52) U.S. Cl. ...................................... 701/209; 340/988
(58) Field of Classification Search ................ 701/200, 701/207–212; 340/988, 990, 995.1; 73/178 R; 342/350, 3.01, 457; 345/156–163
See application file for complete search history.

(56) References Cited

U.S. PATENT DOCUMENTS 5,646,856 A * 7/1997 Kaesser ...................... 701/207
7,599,770 B2 * 10/2009 Hardy ......................... 701/35

FOREIGN PATENT DOCUMENTS

CN  1415834 A  5/2003
JP  2000-111354 A  4/2000

OTHER PUBLICATIONS

Chinese Office Action dated Dec. 4, 2009 with English translation (eight (8) pages).

* cited by examiner

*Primary Examiner*—Dalena Tran
(74) *Attorney, Agent, or Firm*—Crowell & Moring LLP

(57) ABSTRACT

A navigation system includes: a detection unit that detects a vehicle to be in a stationary state or in a traveling state; a display monitor at which a roadmap is displayed; and a manual route specification unit that allows a road traced on the display monitor to be specified as a route when the vehicle is detected to be in a stationary state by the detection unit and does not allow the road traced on the display monitor to be specified as the route when the vehicle is detected to be in a traveling state by the detection unit.

4 Claims, 10 Drawing Sheets

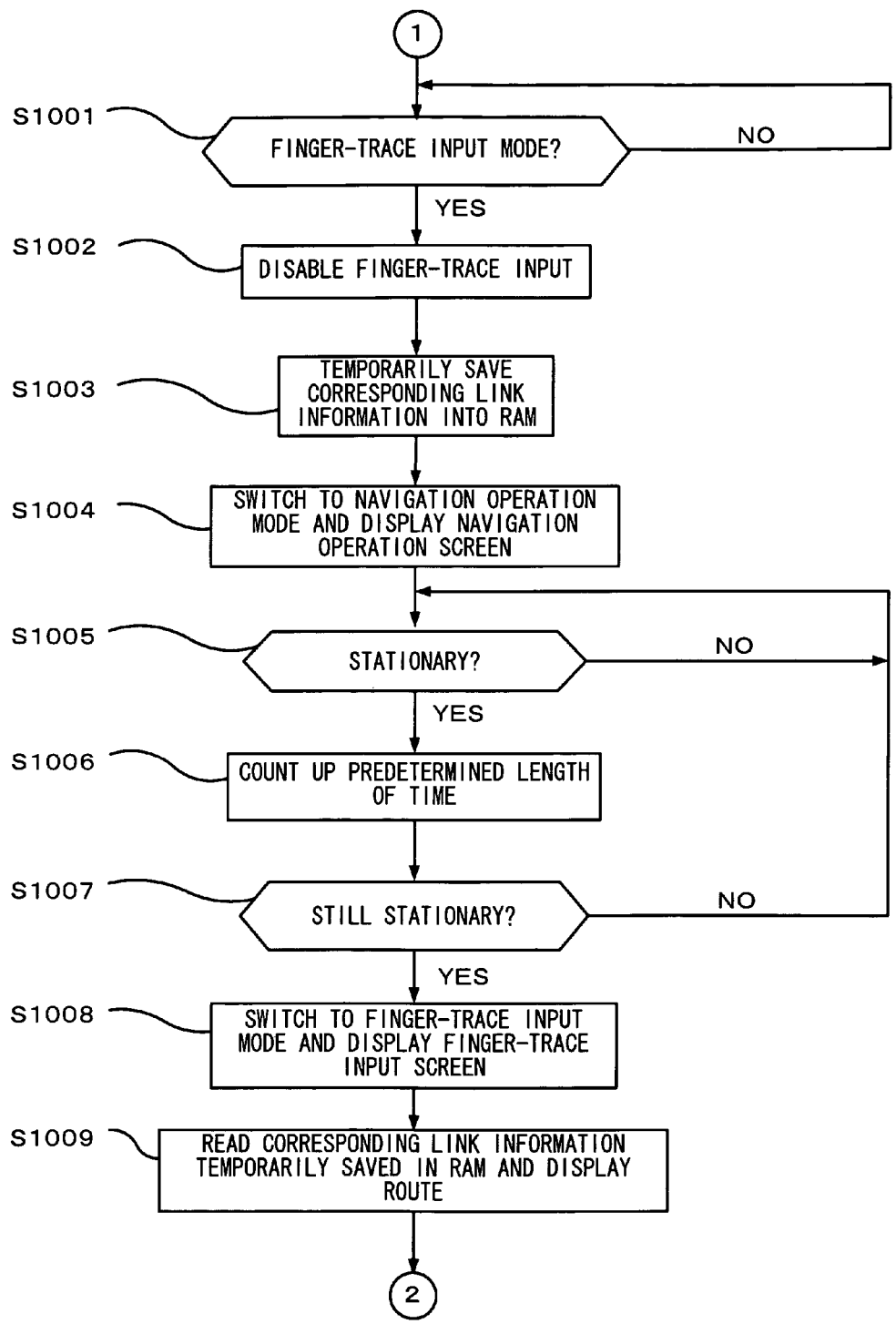

NAVIGATION SYSTEM

INCORPORATION BY REFERENCE

The disclosure of the following priority application is herein incorporated by reference:
Japanese Patent Application No. 2005-354304 filed Dec. 8, 2005

BACKGROUND OF THE INVENTION

1. Field of the Invention

The present invention relates to a navigation system that allows the user to specify a traveling route for a vehicle by tracing roads on display.

2. Description of Related Art

There is a navigation system known in the related art that allows the user to specify a road on which he wishes to travel to a destination by tracing the road on display at the display screen with his finger or a touch pen (see Japanese Laid Open Patent Publication No. 2000-111354).

SUMMARY OF THE INVENTION

The navigation system disclosed in Japanese Laid Open Patent Publication No. 2000-111354 allows the user to specify a road on which he wishes to travel by tracing it on the screen with his finger regardless of whether the vehicle is in a stationary state or in a traveling state. This leads to a problem that the user may specify the road on which he wishes to travel by tracing the display on the screen with his finger while the vehicle is traveling.

According to the 1st aspect of the invention, a navigation system, comprises: a detection unit that detects a vehicle to be in a stationary state or in a traveling state; a display monitor at which a roadmap is displayed; and a manual route specification unit that allows a road traced on the display monitor to be specified as a route when the vehicle is detected to be in a stationary state by the detection unit and does not allow the road traced on the display monitor to be specified as the route when the vehicle is detected to be in a traveling state by the detection unit.

According to the 2nd aspect of the invention, in the navigation system according to the 1st aspect, it is preferred that: there is further provided a storage unit in which a route having been specified via the manual route specification unit is stored; and if the detection unit detects that the vehicle has entered a traveling state while the route is being specified via the manual route specification unit, processing for route specification by the manual route specification unit is interrupted, the route having been specified so far is stored into the storage unit, and the manual route specification unit reads the route stored in the storage unit and resumes the processing for the route specification as the detection unit subsequently detects that the vehicle has shifted into a stationary state.

According to the 3rd aspect of the invention, in the navigation system according to the 1st aspect, it is preferred that: there is further provided a storage unit in which a route having been specified via the manual route specification unit is stored; and if the detection unit detects that the vehicle has entered a traveling state while the route is being specified via the manual route specification unit, processing for route specification by the manual route specification unit is interrupted, the route having been specified so far is stored into the storage unit, and the manual route specification unit reads the route stored in the storage unit and resumes the processing for the route specification as the detection unit subsequently detects that the vehicle has been in a stationary state over a predetermined length of time or longer.

According to the 4th aspect of the invention, in the navigation system according to any one of the 1st through the 3rd aspects, it is preferred that there is further provided: an input setting unit that sets a destination input thereto; a position detection unit that detects a current position of the vehicle; a route search unit that searches for a route from the current position of the vehicle detected by the position detection unit to the destination input and set at the input setting unit; a selection unit that selects either a route specification via the manual route specification unit or a route search by the route search unit; and a display switching unit that displays a manual route input screen at the display monitor when the route specification via the manual route specification unit is selected at the selection unit and displays a route search input screen at the display monitor when the route search by the route search unit is selected at the selection unit.

BRIEF DESCRIPTION OF THE DRAWINGS

FIG. 10 presents a flowchart of the route specification processing executed in the navigation system in the finger-trace input mode.

DESCRIPTION OF PREFERRED EMBODIMENT

Figure 1:
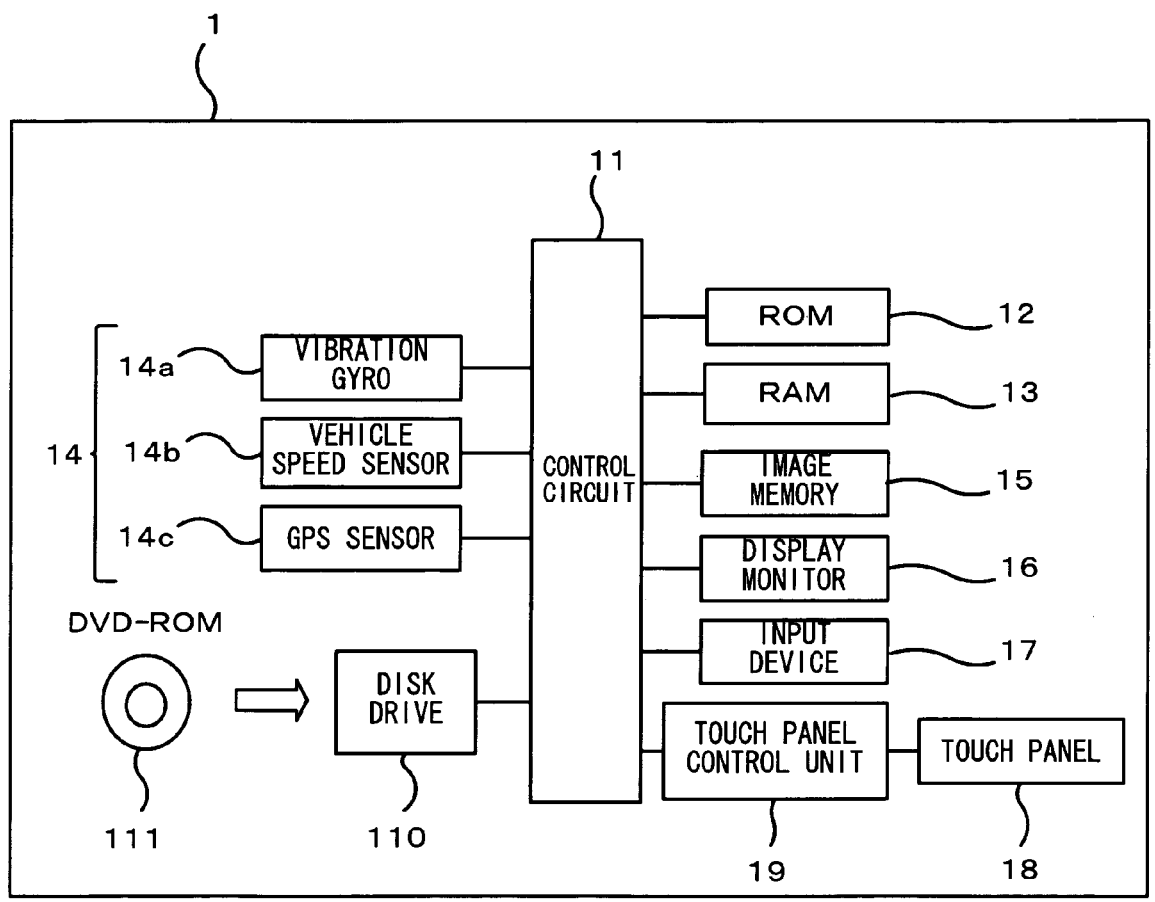
FIG. 1 is a block diagram showing the structure of the navigation system achieved in an embodiment of the present invention.

FIG. 1 shows the structure adopted in the navigation system achieved in an embodiment of the present invention. The navigation system 1 in FIG. 1 allows the user to specify a route to a destination by tracing it on a display monitor 16. The navigation system 1, which is installed in a vehicle, comprises a control circuit 11, a ROM 12, a RAM 13, a current position detection device 14, an image memory 15, the display monitor 16, an input device 17, a touch panel 18 and a disk drive 110.

The touch panel 18 is a transparent touch switch layered over the surface of the display monitor 16 and an image displayed at the display monitor 16 is viewed through the touch panel 18. The touch panel 18 outputs a signal corresponding to an operating position on the touch panel 18 to a touch panel control unit 19, which then calculates the position at which the touch panel 18 has been touched.

A DVD-ROM 111 having recorded therein map data used to display a map at the display monitor 16 is loaded into the disk drive 110. The map data include map display data and route search data. The route search data, in turn, include link information and node information pertaining to the roads described in the map data. The map display data are provided as map data in a plurality of scaling factors, from wide-area to detailed, and the scaling factor of the map on display can be adjusted in response to a user request.

The control circuit 11, which is constituted with a microprocessor and its peripheral circuits, uses the RAM 13 as its work area when it executes a control program stored in the ROM 12 to implement various types of control. As the control circuit 11 executes a specific type of route search processing based upon the map data stored in the DVD-ROM 111, the processing results are indicated as a recommended route at the display monitor 16.

The current position detection device 14, which detects the current position of the vehicle, may be constituted with a vibration gyro 14a that detects the advancing azimuth of the vehicle, a vehicle speed sensor 14b that detects the vehicle speed, a GPS sensor 14c that detects a GPS signal transmitted from a GPS (Global Positioning System) satellite and the like. Based upon the current vehicle position detected by the current position detection device 14, the navigation system 1 determines the map display range, the route search start point and the like and indicates the detected current position on the map.

At the image memory 15, image data to be used to display an image at the display monitor 16 are stored. The image data include roadmap drawing data and various types of graphic data, which are generated as necessary based upon the map data read by the disk drive 110 from the DVD ROM 111. The image data thus generated enables the navigation system 1 to display a map and the like.

Various types of information including a roadmap of an area around the subject vehicle position are provided to the user through screen display at the display monitor 16 based upon various types of information including the map data. The input device 17 may be a remote control unit or the like that includes input switches through which the user sets various commands. The user manually operates the input device 17 as prompted by instructions on the display screen at the display monitor to select and set a destination.

The disk drive 110 reads out map data to be used to display a map at the display monitor 16 from the DVD-ROM 111 loaded therein. It is to be noted that the map data may be read from a recording medium other than the DVD-ROM 111, such as a CD-ROM or a hard disk.

As explained earlier, a monitor screen display brought up at the display monitor 16 is viewed through the touch panel 18, which is a transparent panel disposed over the monitor screen at the display monitor 16. The touch panel 18 has an input function similar to that of the input device 17 and as a point on the map, any of various buttons, a display menu or the like on display at the touch panel 18 is depressed with a finger, the touch panel control unit 19 calculates the depressed position. The depressed position thus calculated is input to the control circuit 11 so as to set a destination, engage a function corresponding to the depressed button or display menu, or the like. In addition, as a road on display at the display monitor 16 is traced with a finger, the touch panel 18 is depressed and the traced road is specified as the traveling route for the vehicle.

As the user sets a destination, the navigation system 1 executes a route calculation to determine a route to the destination based upon a predetermined algorithm by designating the current position detected via the GPS sensor 14c as the start point. The route (hereafter referred to as a searched route) thus determined is indicated on the screen display by altering its display mode, e.g., by using a different display color so that it can be distinguished from the other roads. As a result, the user is able to verify the searched route on the map by checking the screen display. In addition, the navigation system 1 guides the vehicle by providing the user with visual or audio directions along the advancing direction so that the vehicle travels along the searched route.

The navigation system 1 achieved in the embodiment of the present invention determines the route from the current position to the destination in one of the following two modes: a finger-trace input mode and a navigation operation mode. The finger-trace input mode and the navigation operation mode are now explained in reference to FIGS. 2~4.

Figure 2:
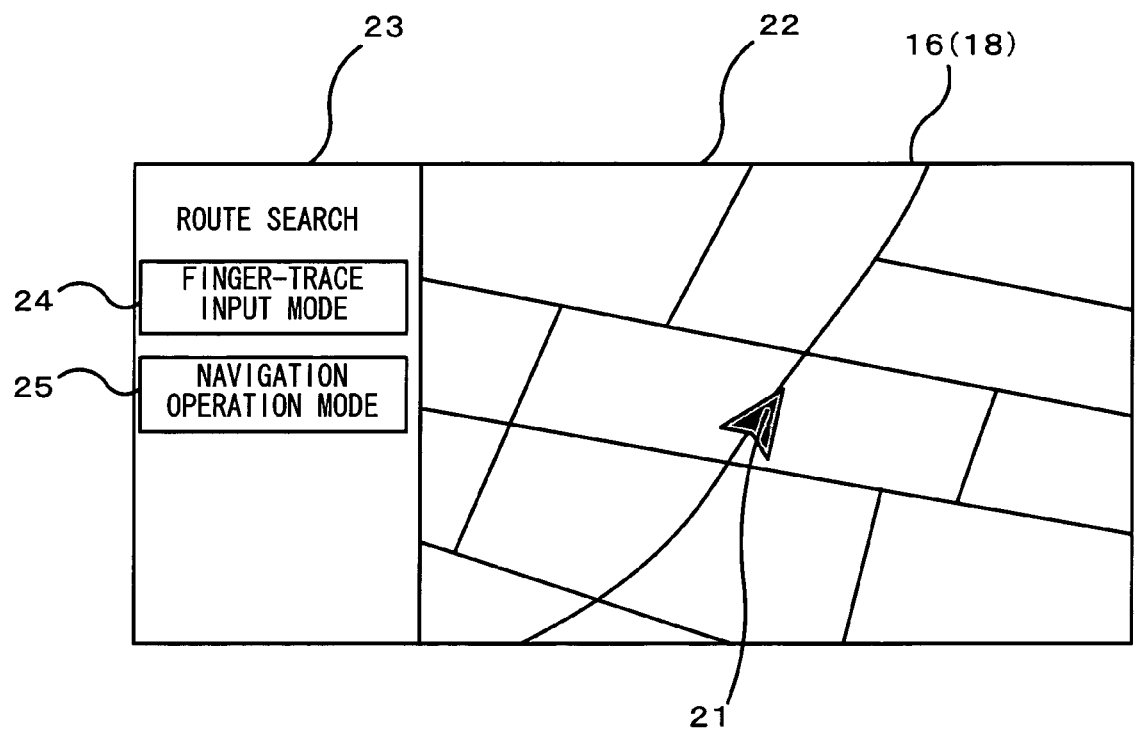
FIG. 2 illustrates a route search menu screen.

As the route search is selected in a menu screen (not shown), a route search screen is brought up on display, as shown in FIG. 2. The route search screen includes a route search mode selection field 23 and a map field 22. A finger-trace input mode button 24 and a navigation operation mode button 25 are displayed in the route search mode selection field 23. A subject vehicle position 21 is indicated in a roadmap of an area around the subject vehicle position in the map field 22.

Figure 3:
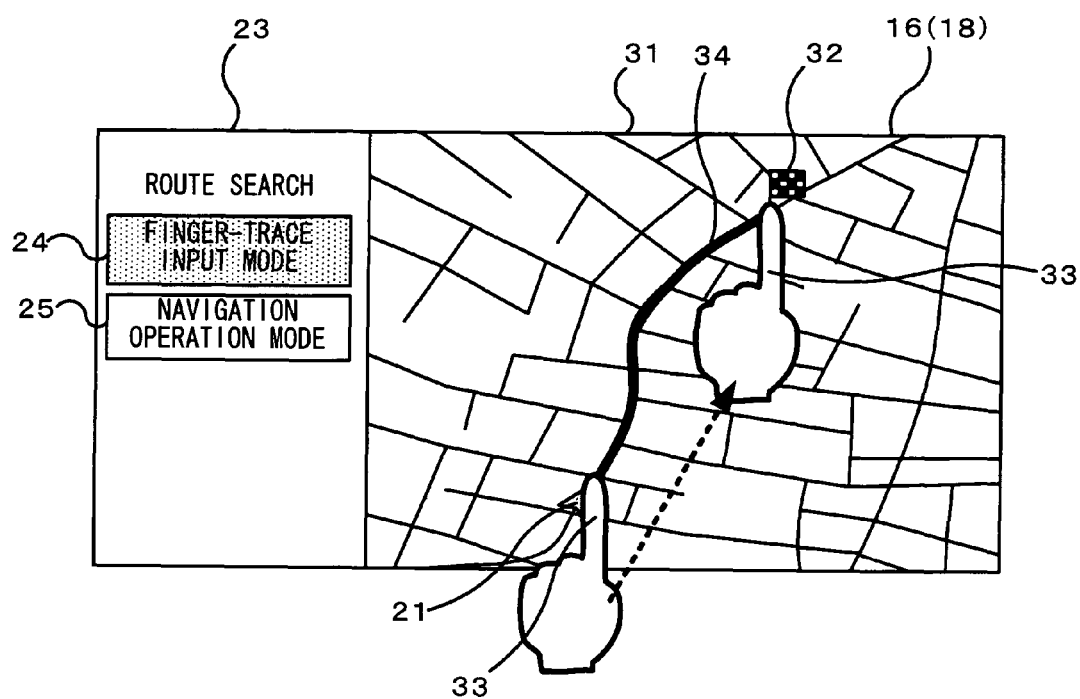
FIG. 3 illustrates the processing for specifying a route on the finger-trace input screen.

The finger-trace input mode button 24 is depressed to specify a vehicle traveling route 34 by tracing roads on the display monitor 16. As the finger-trace input mode button 24 is depressed, a finger-trace input screen 31 is displayed, as shown in FIG. 3. The route to a destination 32 is specified through this finger-trace input screen 31 in the finger-trace input mode. In the finger-trace input mode, a route is specified manually.

The navigation operation mode button 25 is depressed to search for the route 34 to the destination 32 through the route calculation executed by the control circuit 11 based upon the predetermined algorithm. As the navigation operation mode button 25 is depressed, a navigation operation screen 41 is displayed. Then, by depressing a point corresponding to the destination 32 on the roadmap on display at the touch panel 18, for instance, the destination 32 is set.

Next, in reference to FIG. 3, an explanation is given on the processing for specifying the route on the finger-trace input screen 31. A wider area map compared to the roadmap indicating the subject vehicle position 21 in FIG. 2 is displayed in the finger-trace input screen 31. The user traces the road to be traveled on to reach the destination 32 from the subject vehicle position 21 in the finger-trace input screen 31 with his finger 33. Then, as the finger 33 is lifted off the touch panel 18, the route 34 from the subject vehicle position 21, i.e., the current position, to the destination 32 is specified. However, the route specification in the finger-trace input mode is disallowed while the vehicle is traveling.

Figure 4:
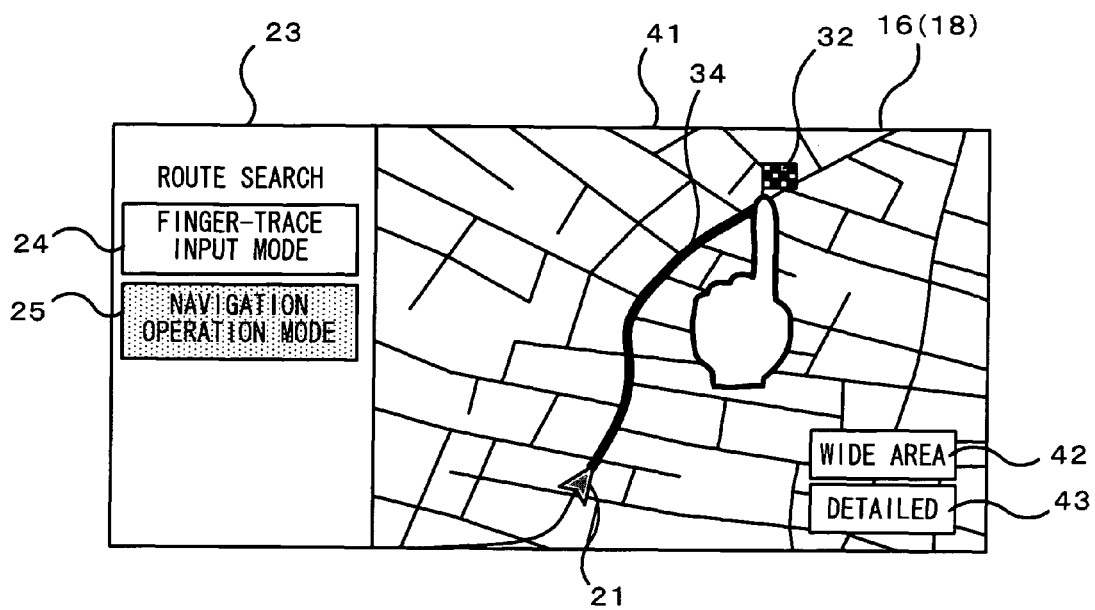
FIG. 4 illustrates the processing for searching for a route in the navigation operation screen.

Next, in reference to FIG. 4, the processing for searching for the route in the navigation operation screen is explained. As explained above, the navigation operation screen 41 is displayed at the display monitor 16 as the navigation operation mode button 25 is depressed. A roadmap indicating the subject vehicle position 21 is displayed in the navigation operation screen 41.

In addition, a wide-area display button 42 depressed to adjust the roadmap scaling factor for wider area display and a detailed display button 43 depressed to adjust the roadmap scaling factor for more detailed display are displayed. By depressing these buttons 42 and 43 the roadmap scaling factor can be adjusted.

The user sets the destination by depressing the destination 32 in the roadmap displayed in the navigation operation screen 41. Then, the route 34 from the subject vehicle position 21, i.e., the current position, to the destination 32 is searched through link cost calculation and the like.

Figure 5:
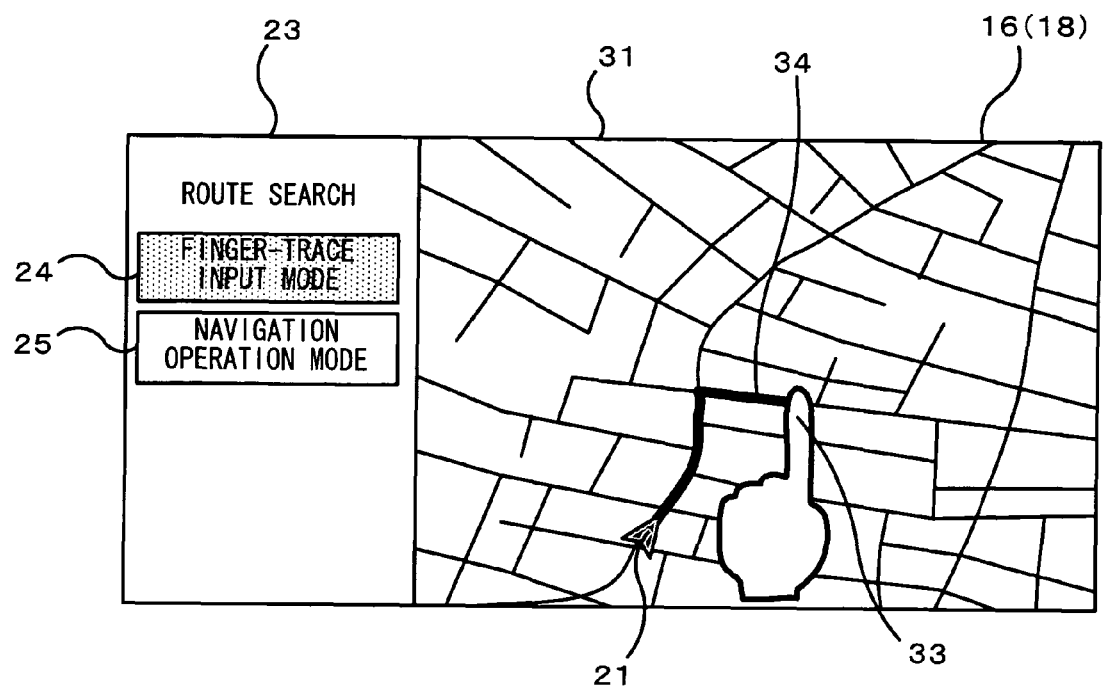
FIG. 5 illustrates an operation performed by the user to specify the traveling route for the vehicle in the finger-trace input mode.

Next, operations performed by the user to specify the traveling route of the vehicle in the finger-trace input mode are explained in reference to FIGS. 5 through 8. As the user depresses the finger-trace input mode button 24 while the vehicle is in a stationary state, the finger-trace input screen 31, on which the traveling route for the vehicle is to be specified in the finger-trace input mode, is brought up on display, as shown in FIG. 5.

As shown in FIG. 5, the user specifies the route 34 to the destination by tracing the roads displayed in the finger-trace input screen 31 with his finger 33. Then, as the vehicle starts traveling while the route specification is in progress, the route having been specified so far is temporarily stored into the RAM 13. In addition, the display is switched from the finger-trace input screen 31 to the navigation operation screen 41 in FIG. 6 and the route specification in the finger-trace input mode is disabled. The specified route 34 is not indicated in the navigation operation screen 41.

Figure 7:
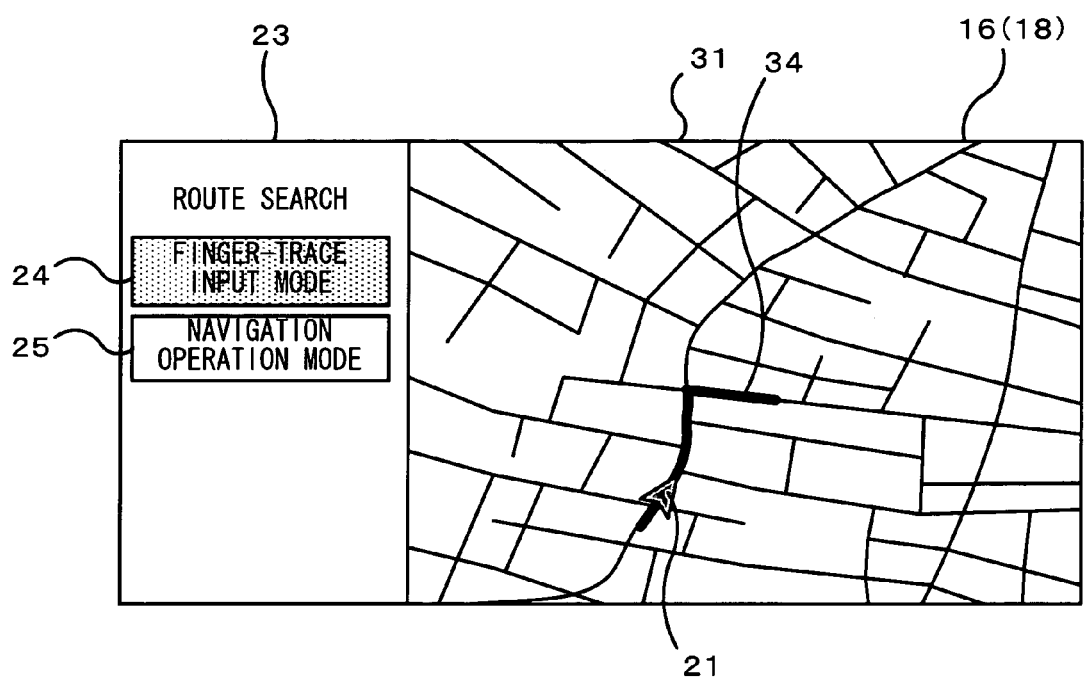
FIG. 7 shows the display screen brought up when the finger-trace input mode having been interrupted after the vehicle started traveling resumes as the vehicle subsequently stops.
Figure 8:
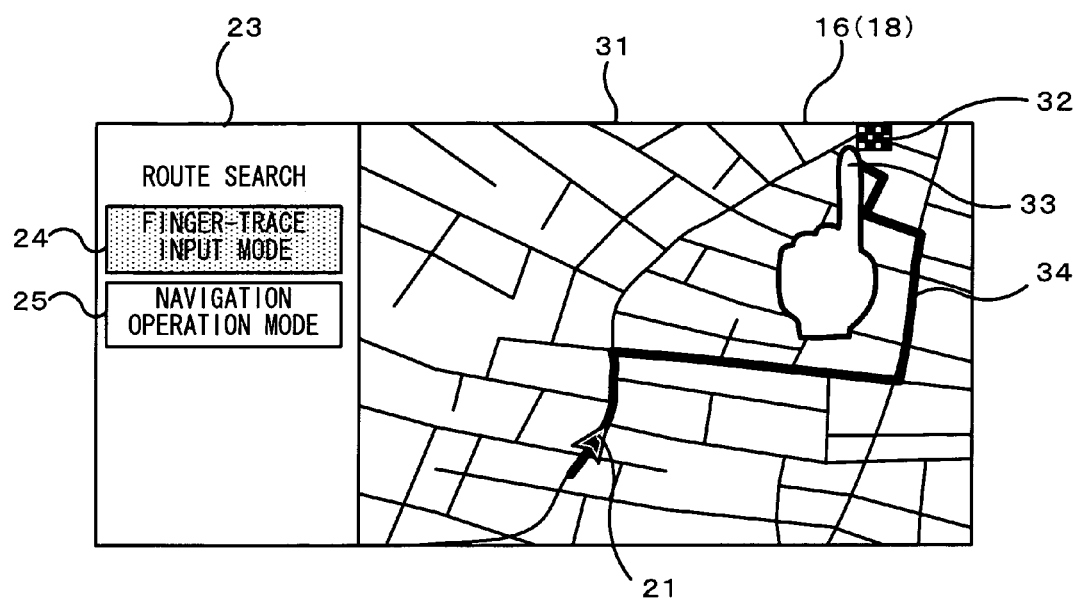
FIG. 8 illustrates an operation performed by the user to specify the traveling route for the vehicle in the finger-trace input mode.

As the vehicle reenters a stationary state, the finger-trace input screen 31 in FIG. 7 is brought up on display again at the display monitor 16. In the finger-trace input screen 31, the route 34 having been specified when the finger-trace input mode was interrupted is brought up on display at this time. This allows the user to start specifying the route 34 from the point at which the operation was interrupted. The route 34 to the destination 32 can be thus specified, as shown in FIG. 8.

Figure 9:
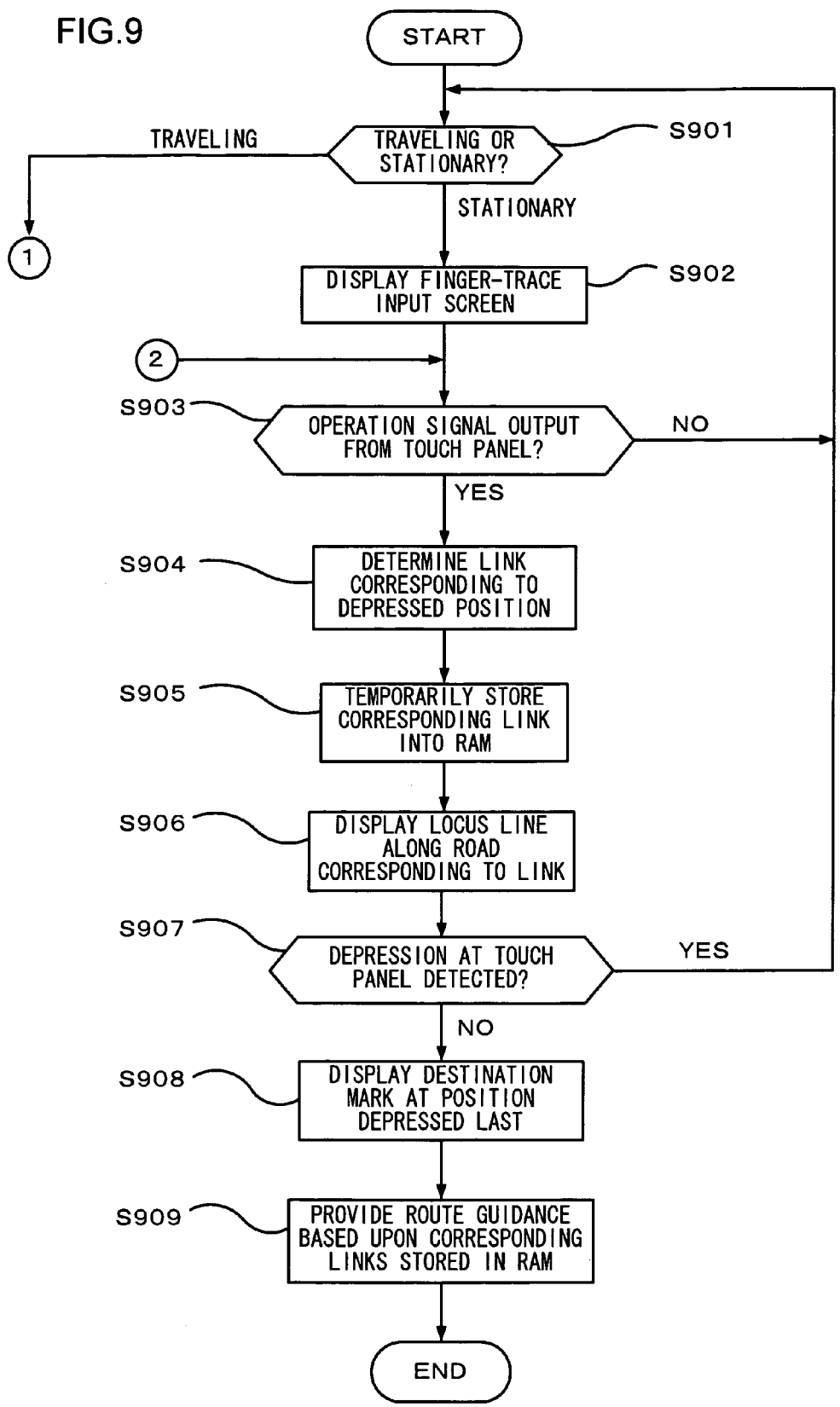
FIG. 9 presents a flowchart of the route specification processing executed in the navigation system in the finger-trace input mode.

The route specification processing executed in the finger-trace input mode described above is now explained in reference to the flowchart presented in FIGS. 9 and 10. The processing in FIGS. 9 and 10 is executed in the control circuit 11 in conformance to a program started up in response to a depression of the finger-trace input mode button 24.

In step S901, a decision is made based upon the vehicle speed detected via the vehicle speed sensor 14b as to whether the vehicle is in a traveling state or in a stationary state. If the vehicle is determined to be traveling, the operation proceeds to step S1001 in FIG. 10. If, on the other hand, the vehicle is determined to be in a stationary state, the operation proceeds to step S902. In step S902, the finger-trace input screen 31 is brought up on display at the display monitor 16. In step S903, a decision is made as to whether or not an operation signal is output in response to a depression of the touch panel 18 and if an affirmative decision is made in step S903, the operation proceeds to step S904. If no operation signal is detected, the operation returns to step S901.

In step S904, a link corresponding to the operation signal output from the touch panel 18 is determined. The corresponding link is determined as explained below. Namely, the depressed position on the touch panel 18 is calculated based upon the operation signal and also, the depressed position on the map is calculated. Then, nodes present within a predetermined range from the depressed position on the map are extracted from the map data stored in the DVD-ROM 111. The links connected to the extracted nodes are next extracted and the distances from the links to the depressed position on the map are calculated. The link with the smallest distance among the distances thus calculated is determined to be the corresponding link.

In step S905, the corresponding link is temporarily stored into the RAM 13. In step S906, a locus line extending along the road corresponding to the corresponding link, i.e., the route 34, is displayed. In step S907, a decision is made as to whether or not the touch panel 18 has been depressed. If an affirmative decision is made in step S907, the operation returns to step S901. If a negative decision is made, it is assumed that the finger 33 has been lifted off the touch panel 18, and the operation proceeds to step S908. In step S908, a destination mark 32 is displayed at the position at which a depression was last detected. In step S909, route guidance is executed based upon a plurality of corresponding links stored in the RAM 13. The route specification processing then ends.

In step S1001 in FIG. 10, a decision is made as to whether or not the finger-trace input mode is currently selected in the navigation system 1. If the navigation system is in the finger-trace input mode, an affirmative decision is made in step S1001 and the operation proceeds to step S1002. If, on the other hand, the navigation system is not in the finger-trace input mode, the processing in step S1001 is repeatedly executed.

Figure 6:
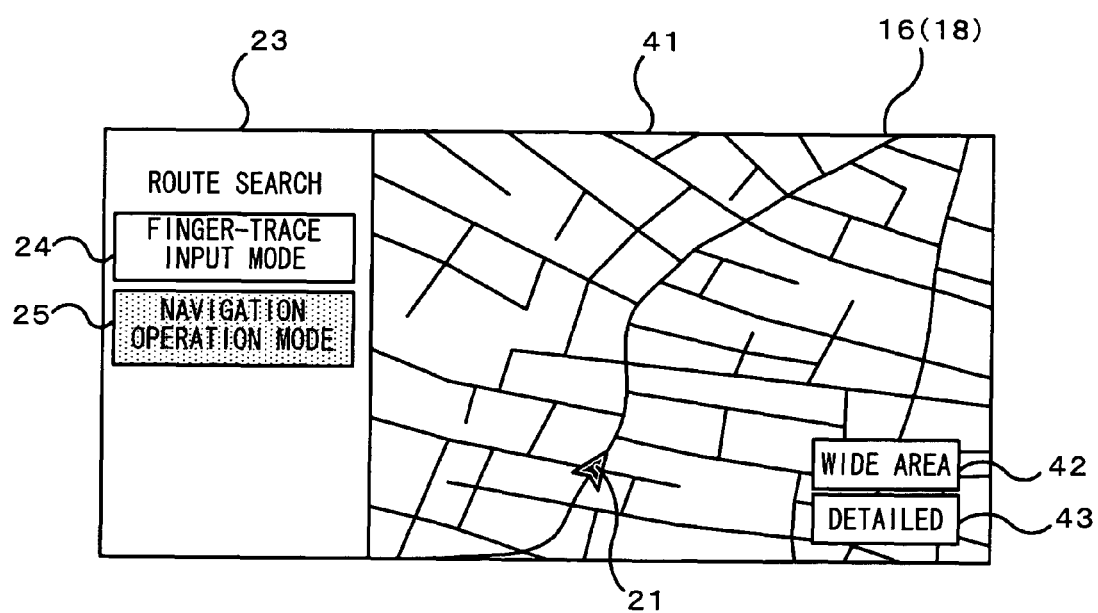
FIG. 6 shows the display screen brought up when the vehicle starts traveling while specifying the route in the finger-trace input mode.

In step S1002, the specification of the route 34 through finger-trace input is disabled. In step S1003, information indicating the corresponding links having been specified through the finger-trace input is temporarily saved into the RAM 13. In step S1004, the navigation system 1 is switched to the navigation operation mode and the navigation operation screen 41 such as that shown in FIG. 4 or 6 is brought up on display.

In step S1005, a decision is made based upon the vehicle speed detected via the vehicle speed sensor 14b as to whether or not the vehicle is in a stationary state. If the vehicle is in a stationary state, an affirmative decision is made in step S1005 and the operation proceeds to step S1006. If the vehicle is not in a stationary state, on the other hand, the processing in step S1005 is repeatedly executed. In step S1006, a predetermined length of time is counted up. Then, upon counting up the predetermined length of time, i.e., after the predetermined length of time elapses, the operation proceeds to step S1007. In step S1007, a decision is made as to whether or not the vehicle is still in a stationary state. If the vehicle is still in a stationary state, an affirmative decision is made in step S1007 and the operation proceeds to step S1008. If the vehicle is in a traveling state, on the other hand, a negative decision is made in step S1007 and the operation returns to step S1005.

In step S1008, the navigation system 1 is switched to the finger-trace input mode and the finger-trace input screen 31 in FIG. 3 is brought up on display. In step S1009, the corresponding link information having been temporarily saved into the RAM 13 is read, and a locus line along the roads corresponding to the corresponding links, i.e., the route 34, is displayed. The operation then proceeds to step S903 in FIG. 9.

The following advantages are achieved in the navigation system 1 in the embodiment described above.

(1) While the vehicle is traveling, a road on display at the display monitor 16 is not specified as part of the traveling route for the vehicle even if it is traced with the finger 33. As a result, a user operation for tracing a road on display at the touch panel 18 with his finger 33 while the vehicle is traveling can be prevented.

(2) If the vehicle traveling route specification in the finger-trace input mode is interrupted as the vehicle starts traveling, the information indicating the corresponding links having been specified so far is temporarily stored into the RAM 13. Then, the corresponding link information having been thus temporarily stored is read out from the RAM 13 and is displayed on the map when the vehicle reenters a stationary state and the route specification operation resumes. As a result, the route specification can be resumed at the last point on the route where the specification operation was interrupted. In other words, since the route specification does not need to be started over again from scratch, the route can be specified in the finger-trace input mode with a high level of efficiency.

(3) If the vehicle starts traveling while the vehicle traveling route is being specified in the finger-trace input mode, the finger-trace input mode display is immediately switched to the navigation operation mode display. Thus, the user understands immediately that route specification in the finger-trace input mode has been disabled and this prevents the user from performing a superfluous operation of tracing a road on display at the touch panel 18 with his finger 33 while the vehicle is traveling.

(4) After the route specification processing in the finger-trace input mode is interrupted as the vehicle starts traveling, the route specification processing in the finger-trace input mode is resumed if the vehicle reenters a stationary state and remains in the stationary state over a predetermined length of time. Thus, a frequent changeover between the finger-trace input mode and the navigation operation mode does not occur when the vehicle traveling on a congested road stops and starts repeatedly. As a result, unnecessary and distracting display changeovers are prevented.

(5) The user is able to choose either the vehicle traveling route specification through finger-trace input or route specification through route search, simply by selecting either the finger-trace input mode button 24 or the navigation operation mode button 25 displayed in the route search mode selection field 23. In other words, since the user is able to set the route to the destination in an optimal manner for a given set of circumstances, e.g., whether he wants to reach the destination as soon as possible or would like to make a detour for a scenic drive, and better convenience to the user is assured.

The navigation system 1 achieved in the embodiment described above allows for the following variations.

(1) While the corresponding link information is temporarily stored into the RAM 13 so as to allow the route specification in the finger-trace input mode to be resumed at the point where it was interrupted in the embodiment described above, the contents of the data stored into the RAM 13 are not limited to those in the embodiment as long as the specification in the finger-trace input mode can be resumed where it left off. For instance, the positional coordinates of the point on the touch panel 18, which is depressed when the specification is interrupted may be stored instead.

(2) While the finger-trace input mode is initially selected in the navigation system 1, the navigation operation mode may be sustained without shifting into the finger-trace input mode when the vehicle, having been traveling without first starting the finger-trace route specification, subsequently enters a stationary state. The rationale for sustaining the navigation operation mode under such circumstances would be that once the vehicle starts traveling, the vehicle is likely to keep traveling without staying in a stationary state over an extended period of time and thus, the logical likelihood of specifying the route to the destination from the start point in the time-consuming finger-trace input mode is low.

(3) When the finger-trace input mode having been interrupted by a vehicle traveling operation is resumed as the vehicle reenters a stationary state, the corresponding link information stored in the RAM 13 may be erased and the operation may be switched to the navigation operation mode if a depression at the touch panel 18 is not detected within a predetermined length of time after the vehicle comes to a stop. The rationale for switching to the navigation operation mode under these circumstances is that if the touch panel 18 is not depressed within a specific length of time after the vehicle enters a stationary state, the user is no longer likely to wish to specify the route to the destination in the finger-trace input mode or the user is likely to have forgotten his initial intent to specify the route in the finger-trace mode.

(4) Only part of the route to the destination may be specified in the finger-trace input mode. For instance, when there are two waypoints on the route to the destination, the route between the two waypoints may be specified in the finger-trace input mode and the route from the start point to the first waypoint and the route from the second waypoint to the destination may be specified through the route calculation.

(5) The control program in the navigation system 1 described above may be installed in a personal computer to allow the personal computer to function as a navigation system. In such a case, the control program to allow the personal computer to function as a navigation system may be provided in a recording medium such as a DVD or a CD-ROM, through a data signal on the Internet or the like. In other words, the control program through which the navigation system with the characteristics described above is achieved can be distributed as a computer-readable computer program product adopting any of various modes including a recording medium and a carrier wave. The personal computer used in such an application needs to include a touch panel installed at the display screen thereof, or specific roads may be traced with the cursor on display.

The above described embodiment is an example and various modifications can be made without departing from the spirit and scope of the invention.

What is claimed is:

1. A navigation system, comprising:
   a detection unit that detects a vehicle to be in a stationary state or in a traveling state;
   a display monitor at which a roadmap is displayed; and
   a manual route specification unit that allows a road traced on the display monitor to be specified as a route when the vehicle is detected to be in a stationary state by the detection unit and does not allow the road traced on the display monitor to be specified as the route when the vehicle is detected to be in a traveling state by the detection unit.

2. A navigation system according to claim 1, further comprising:
   a storage unit in which a route having been specified via the manual route specification unit is stored, wherein:
   if the detection unit detects that the vehicle has entered a traveling state while the route is being specified via the manual route specification unit, processing for route specification by the manual route specification unit is interrupted, the route having been specified so far is stored into the storage unit, and the manual route specification unit reads the route stored in the storage unit and resumes the processing for the route specification as the detection unit subsequently detects that the vehicle has shifted into a stationary state.

3. A navigation system according to claim 1, further comprising:
   a storage unit in which a route having been specified via the manual route specification unit is stored, wherein:
   if the detection unit detects that the vehicle has entered a traveling state while the route is being specified via the manual route specification unit, processing for route specification by the manual route specification unit is interrupted, the route having been specified so far is stored into the storage unit, and the manual route specification unit reads the route stored in the storage unit and resumes the processing for the route specification as the detection unit subsequently detects that the vehicle has been in a stationary state over a predetermined length of time or longer.

4. A navigation system according to claim 1, further comprising:
   an input setting unit that sets a destination input thereto;
   a position detection unit that detects a current position of the vehicle;
   a route search unit that searches for a route from the current position of the vehicle detected by the position detection unit to the destination input and set at the input setting unit;
   a selection unit that selects either a route specification via the manual route specification unit or a route search by the route search unit; and
   a display switching unit that displays a manual route input screen at the display monitor when the route specification via the manual route specification unit is selected at the selection unit and displays a route search input screen at the display monitor when the route search by the route search unit is selected at the selection unit.

* * * * *